(12) United States Patent
Gu et al.

(10) Patent No.: US 11,278,846 B2
(45) Date of Patent: Mar. 22, 2022

(54) METHOD FOR PREPARING DEFECT-FREE DDR MOLECULAR SIEVE MEMBRANE

(71) Applicant: Nanjing University of Technology, Nanjing (CN)

(72) Inventors: Xuehong Gu, Nanjing (CN); Lin Wang, Nanjing (CN); Chun Zhang, Nanjing (CN)

(73) Assignee: Nanjing University of Technology, Nanjing (CN)

( * ) Notice: Subject to any disclaimer, the term of this patent is extended or adjusted under 35 U.S.C. 154(b) by 193 days.

(21) Appl. No.: 16/470,230

(22) PCT Filed: Jun. 9, 2017

(86) PCT No.: PCT/CN2017/087673
§ 371 (c)(1),
(2) Date: Jun. 16, 2019

(87) PCT Pub. No.: WO2018/107675
PCT Pub. Date: Jun. 21, 2018

(65) Prior Publication Data
US 2019/0366274 A1    Dec. 5, 2019

(30) Foreign Application Priority Data

Dec. 16, 2016 (CN) .......................... 201611168507.3

(51) Int. Cl.
*B01D 67/00* (2006.01)
*B01D 53/22* (2006.01)
(Continued)

(52) U.S. Cl.
CPC ....... *B01D 67/0051* (2013.01); *B01D 53/228* (2013.01); *B01D 71/028* (2013.01);
(Continued)

(58) Field of Classification Search
None
See application file for complete search history.

(56) References Cited

U.S. PATENT DOCUMENTS

2009/0011926 A1* 1/2009 Yajima ............... B01D 67/0051
502/62
2013/0280430 A1* 10/2013 Ramachandran .... B01D 71/028
427/374.1
(Continued)

OTHER PUBLICATIONS

Heng, Samuel et al., "Low-temperature ozone treatment for organic template removal from zeolite membrane", Journal of Membrane Science, 243, 2004, pp. 69-78. (Year: 2004).*
(Continued)

*Primary Examiner* — Jason M Greene
(74) *Attorney, Agent, or Firm* — Proi Intellectual Property US

(57) ABSTRACT

Provided is a method for preparing a defect-free DDR molecular sieve membrane. Sigma-1 molecular sieve is used as an inducing seed crystal to prepare and obtain a continuous and compact DDR molecular sieve membrane on the surface of a porous ceramic support. An ozone atmosphere or an external field assisted technology is used to remove a template in the pores of the molecular sieve membrane at a low temperature. The invention avoids the formation of intercrystal defects and cracks, an activated DDR molecular sieve membrane has a good selectivity for separating $CO_2$, and the membrane preparation time is significantly reduced.

8 Claims, 4 Drawing Sheets

(51) Int. Cl.
*B01D 71/02* (2006.01)
*B01D 69/10* (2006.01)

(52) U.S. Cl.
CPC .......... *B01D 69/10* (2013.01); *B01D 2323/08* (2013.01); *B01D 2323/14* (2013.01); *B01D 2323/28* (2013.01); *B01D 2323/345* (2013.01); *B01D 2325/02* (2013.01)

(56) References Cited

U.S. PATENT DOCUMENTS

2015/0321141 A1* 11/2015 Tang .................... B01D 71/028 96/6
2016/0175815 A1* 6/2016 Brody .................... B01D 53/02 95/96
2017/0036175 A1* 2/2017 Tanabe ................. B01D 53/228

OTHER PUBLICATIONS

Kuhn, Jelan et al., "Detemplation of DDR type zeolites by ozonication", Microporous and Mesoporous Materials, 120, 2009, pp. 12-18. (Year: 2009).*

Parikh, Atul N. et al., "Non-thermal calcination by ultraviolet irradiation in the synthesis of microporous materials", Microporous and Mesoporous Materials, 76, 2004, pp. 17-22. (Year: 2004).*

Gallis, Karl W. et al., "Rapid Calcination of Nanostructured Silicate Composites by Microwave Irradiation", Advanced Materials, 13, 2001, pp. 23-26. (Year: 2001).*

Yang, Shaowei et al., "DDR-type zeolite membrane synthesis, modification, and gas permeation studies", Journal of Membrane Science, 505, 2016, pp. 194-204. (Year: 2016).*

* cited by examiner

METHOD FOR PREPARING DEFECT-FREE DDR MOLECULAR SIEVE MEMBRANE

FIELD OF THE INVENTION

The invention provides a method for preparing a defect-free DDR zeolite membrane, in particular to a method for preparing a low-temperature activated zeolite membrane to obtain a defect-free high-performance DDR zeolite membrane, and belongs to the field of inorganic materials.

BACKGROUND OF THE INVENTION

Methane is the main component of natural gas. In addition, natural gas usually contains impurities such as $CO_2$, $H_2S$ and water vapor, which corrode pipelines during its transportation and reduce the combustion heat value. Therefore, it is very important to efficiently remove foreign gases (mainly $CO_2$) from natural gas. In recent years, new membrane separation technology has attracted widespread attention due to its advantages of low energy consumption and environmental friendliness compared with the traditional amine absorption method and other technologies. DDR zeolite has a special octatomic ring structure, and its skeleton structure contains silica and oxygen elements only, so it has excellent thermochemical stability. DDR zeolite has a pore size of only 0.36×0.44 nm, which is relatively small in various zeolites, and is especially suitable for separating small molecular gases. Meanwhile, DDR zeolite membrane has preferential adsorption effect on $CO_2$, and the hydrophobic structure of all silica makes DDR zeolite membrane almost unaffected by water vapor in the process of separating $CO_2/CH_4$, thus having broad application prospects.

In 2004, Tomita et al. (Tomita T et al. Microporous Mesoporous Mater., 2004(68): 71-75) reported a method for preparing a DDR zeolite membrane for the first time, which requires a long synthesis period; specifically, only in-situ synthesis of DDR seed crystal requires 25 days. After that, Bose et al. (Bose A et al. RSC Adv., 2014(4): 19043-19052) quickly synthesized DDR zeolite membrane by an ultrasonic chemical method, and shortened the synthesis period to 7 days. However, the prepared DDR zeolite membrane has to be activated at a temperature greater than 600° C. to remove the template in the membrane pores, but the membrane layer is extremely easy to generate cracks or large intercrystal defects during activation at high temperature, resulting in a sharp decline in the separation performance of the membrane. Then, Kanezashi et al. from Japan (Kanezashi M et al. AIChE J., 2008(6): 1478-1486) modified the DDR zeolite membrane by a chemical vapor deposition technique to make up for intercrystal defects, and Yang et al. (Yang S et al. J. Mater. Sci., 2016(505): 194-204) found cracks in the membrane layer when the DDR zeolite membrane was calcinated at high temperature, and repaired them by a liquid phase chemical deposition method. Unfortunately, these repair methods usually require complicated steps and cannot achieve good separation effect.

SUMMARY OF THE INVENTION

The purpose of the invention is to provide a method for preparing a defect-free DDR zeolite membrane, characterized in that the DDR zeolite membrane can be rapidly prepared while the template can be removed from the pores of the DDR zeolite membrane at low temperature; the Sigma-1 zeolite is used as a seed crystal for inducing the DDR zeolite membrane, so as to shorten the synthesis time; and the zeolite membrane is activated at low temperature in special atmosphere or by an external field assisted technology, thus avoiding the formation of intercrystal defects and cracks.

A method for preparing a defect-free DDR zeolite membrane comprises the following steps:

Step 1 preparing a support loaded with seed crystals: adding the Sigma-1 seed crystals into water to prepare a seed crystal suspension, and applying the seed crystal suspension on the surface of the porous support to obtain seed crystals;

Step 2 synthesizing a DDR zeolite membrane: mixing and aging amantadine (ADA), silica source, ethylenediamine (EN) and water as a synthesis liquid; and adding the support loaded with seed crystal into the synthesis liquid for hydrothermal synthesis to generate a DDR zeolite membrane;

Step 3 activating DDR zeolite membrane: treating the synthesized DDR zeolite membrane in an ozone atmosphere or by an external field assisted technology to remove the template ADA, thus obtaining the defect-free DDR zeolite membrane.

In the step 1, the mass concentration of the Sigma-1 seed crystal in water is 0.2-2%; and the time for applying the seed crystal suspension is 5-50 s.

In the step 1, the Sigma-1 zeolite can be directly obtained by hydrothermal synthesis or treated by a high-energy ball milling method.

In the step 1, the porous support is a flat plate, tubular or hollow fiber support.

In the step 1, the method for applying the seed crystal suspension may be selected from one or more of the following methods: spin coating, wiping coating, dip coating or vacuum pumping.

In the step 2, the aging parameters are as follows: aging at 20-120° C. for 1-10 h; the molar ratio of ADA, silica source, EN and water is: $ADA/SiO_2$=0.01-0.2, EN/ADA=8-32, $H_2O$/ADA=20-50; and the parameters of hydrothermal synthesis step are: synthesizing at 130-170° C. for 12 h-4 d.

In the step 3, the as-synthesized DDR zeolite membrane is treated in an ozone atmosphere or by an external field assisted technology for 10-100 h at 20-300° C., with the heating rate being 0.5-2° C./min.

In the step 3, the external field assisted technology is selected from one or more of the following methods: ultraviolet irradiation, microwave digestion or Fenton reaction.

The ultraviolet irradiation intensity is 50-600 mW/cm²; the digestion solution used in the microwave digestion is a mixed solution of nitric acid and hydrogen peroxide, the power of the microwave digestion instrument is 500-2000 W, and the digestion temperature is 90-250° C.; the Fenton reagent in the Fenton reaction is a mixed solution of ferrous sulfate solution and hydrogen peroxide; wherein $FeSO_4 \cdot 7H_2O$ is added into the reaction solution, and the $Fe^{2+}$ concentration is controlled to be 4.0-15.0 mmol/L and the $H_2O_2$ mass concentration is controlled to be 1.0-10.0%. The reaction solution may also contain 0.05-0.1 wt % nonionic surfactant.

Beneficial Effects

In the invention, Sigma-1 zeolite is used to induce the synthesis of DDR zeolite membrane, thus greatly shortening the synthesis time. More importantly, the DDR zeolite membrane is activated at low temperature in a special atmosphere or by an external field assisted technology, which avoids the cracking of the membrane layer and the formation of intercrystal defects, so as to improve the membrane quality. The DDR zeolite membrane synthesized by the method has a thickness of less than 10 microns. The membrane synthesized under the optimal conditions has good performance for separating $CO_2/CH_4$, wherein the permeance is more than $5\times10^{-8}$ mol·m$^{-2}$·s$^{-1}$·Pa$^{-1}$, and the separation selectivity is more than 400 (test temperature: 25° C.; pressure drop: 0.1 MPa).

DETAILED DESCRIPTION OF THE PREFERRED EMBODIMENT

Figure 1:
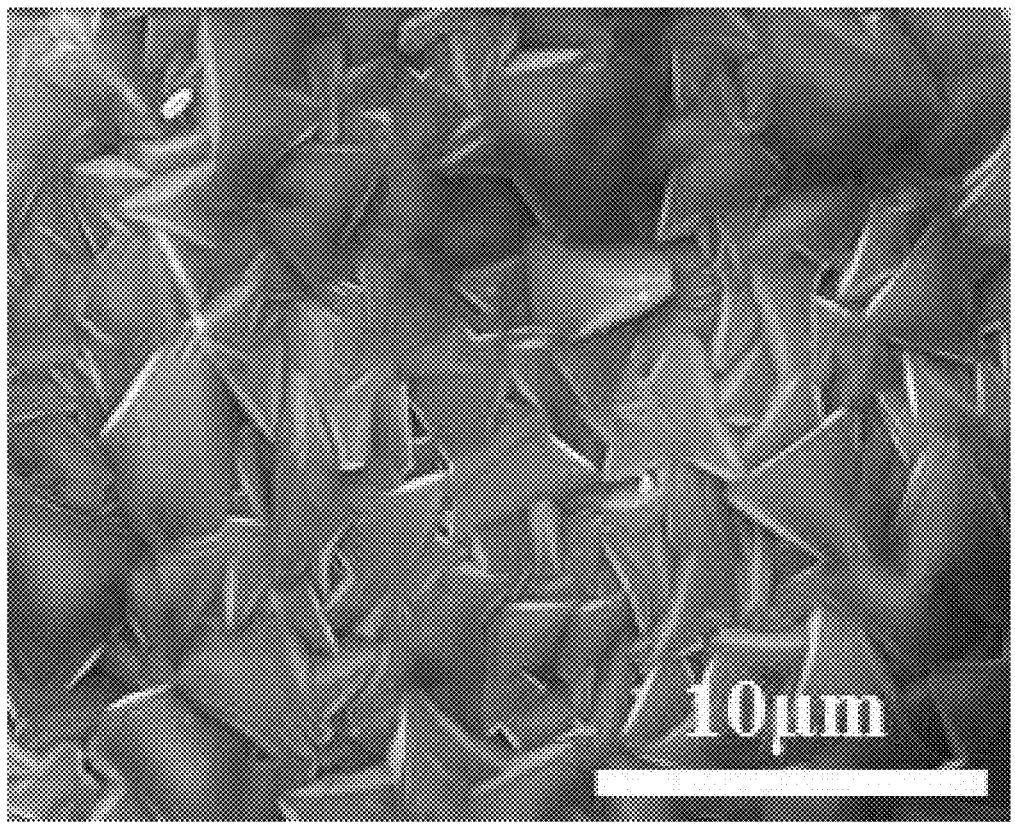
FIG. 1 is the surface of a DDR zeolite membrane synthesized through ball milling of Sigma-1.

The specific embodiments of the invention will be described in detail in combination with technical scheme.

Based on the problems existing in the prior art, Sigma-1 structurally similar to DDR framework is used as a seed crystal to induce the DDR zeolite membranes in the invention, which can obviously shorten the synthesis time. The Sigma-1 zeolite used in the invention has a size of 100 nm-2 μm, and can be directly obtained by hydrothermal synthesis or treated by a high-energy ball milling method. The Sigma-1 zeolite in the following examples and comparative examples are synthesized in the laboratory according to the molar ratio of $ADA:SiO_2:NaAlO_2:NaOH:H_2O=10:60:2:3:2400$. First, it was stirred evenly, and then synthesized at 180° C. for 5 days.

Next, the Sigma-1 zeolite can be prepared into a seed crystal suspension which is applied to the porous support; wherein the mass concentration of the Sigma-1 seed crystal of the seed crystal suspension in water is 0.2-2%, the method for applying the seed crystal suspension can be selected from the following one or more methods: spin coating, wiping coating, dip coating or vacuum pumping; and the time for applying the seed suspension is not particularly limited and may be 5-50 s.

After the seed crystal is applied to the support, it is hydrothermally synthesized into a zeolite membrane in a reaction solution, and the reaction solution is formed by mixing ADA, a silica source, EN and water, wherein ADA acts as a template, the silica source is used as a raw material for synthesizing the zeolite, EN is used as a dispersant and can adjust the pH of the solution, and the molar ratio of each raw material can be as follows: $ADA/SiO_2=0.01-0.2$, $EN/ADA=8-32$, $H_2O/ADA=20-50$; the parameters of hydrothermal synthesis step are: synthesized at 130-170° C. for 12 h-4 d.

Finally, the DDR zeolite membrane is activated at low temperature in a special atmosphere or by an external field assisted technology, which avoids the cracking of the membrane layer and the formation of intercrystal defects, so as to obtain excellent separation performance. Ozone atmosphere can decompose and remove the template, and the external field assisted technologies such as ultraviolet irradiation, microwave digestion or Fenton reaction can also remove the template from the porous channel. In some embodiments, when ultraviolet treatment is used, its intensity may be 50-600 mW/cm$^2$; when microwave digestion treatment is used, the digestion solution is a mixed solution of nitric acid and hydrogen peroxide solution, the power of the microwave digestion instrument is 500-2000 W, and the digestion temperature is 90-250° C.; when Fenton reaction is adopted, Fenton reagent is a mixed solution of ferrous sulfate solution and hydrogen peroxide; wherein $FeSO_4\cdot7H_2O$ is added into the reaction solution, and the $Fe^{2+}$ concentration is controlled to be 4.0-15.0 mmol/L and the $H_2O_2$ mass concentration is controlled to be 1.0-10.0%. In other embodiments, the reaction solution may further include 0.05-0.1 wt % of nonionic surfactant for destroying the interface between the template and the reaction solution and promoting the activation effect of the zeolite.

Example 1

(1) The Sigma-1 zeolite particles already prepared were crushed by a high-energy ball mill into 500 nm fine powder as a seed crystal, the Sigma-1 seed crystal was added into water to prepare into a 1% seed crystal suspension, and the pretreated hollow fiber support was immersed into the seed crystal suspension for 15 s and dried at 100° C. for 10 h to obtain the support loaded with the seed crystal;

(2) Synthesizing DDR zeolite membrane: ADA, silica source, EN and water were mixed, stirred and aged at 30° C. for 1 h ($ADA/SiO_2=0.05$, $EN/ADA=16$, $H_2O/ADA=40$); and a support loaded with seed crystal was placed into a synthesis solution and synthesized at 150° C. for 48 h;

FIG. 1 shows the surface microstructure of a DDR zeolite membrane induced and synthesized through ball milling of Sigma-1, where the support is covered by a continuous and dense membrane layer.

Figure 2:
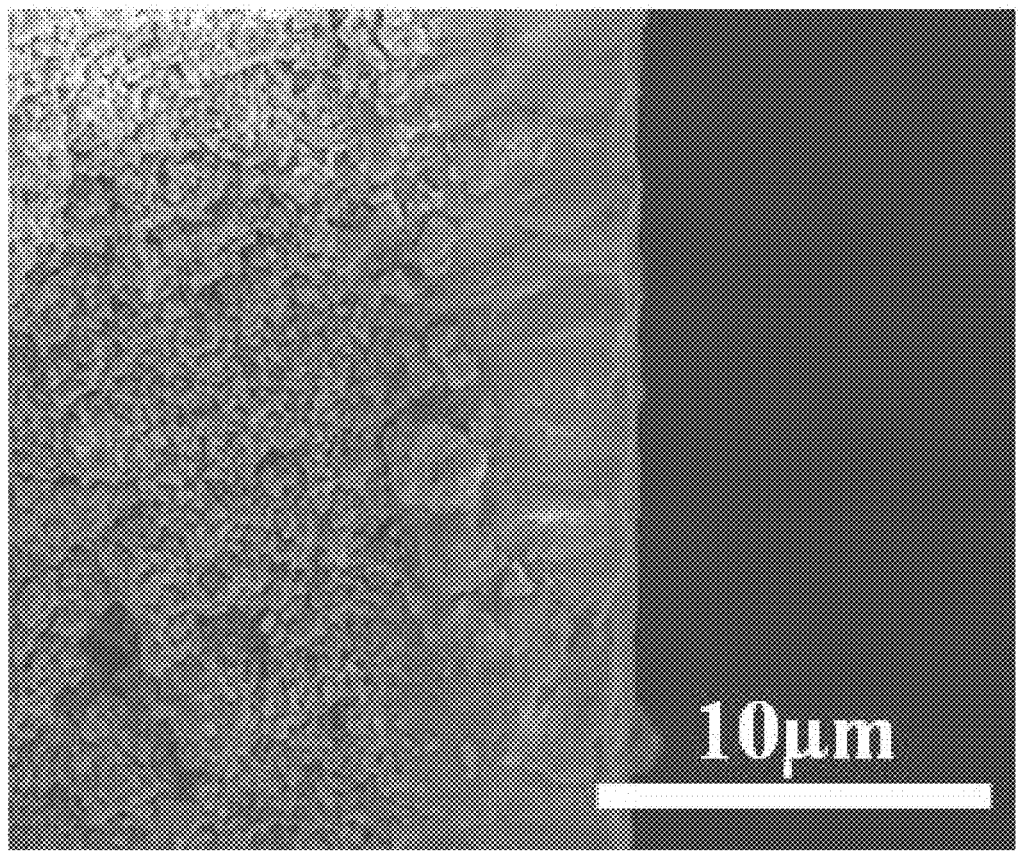
FIG. 2 is a cross-section of a DDR zeolite membrane synthesized through ball milling of Sigma-1.

FIG. 2 shows the cross-sectional microstructure of a DDR zeolite membrane induced and synthesized through ball milling of Sigma-1, where the membrane layer is continuous and compact, and the membrane thickness is 6 μm.

(3) Activating DDR zeolite membrane: the template was removed from the membrane pores in an ozone atmosphere at 200° C. for 60 h, wherein the heating rate was 1° C./min and the cooling rate was 1° C./min.

Figure 3:
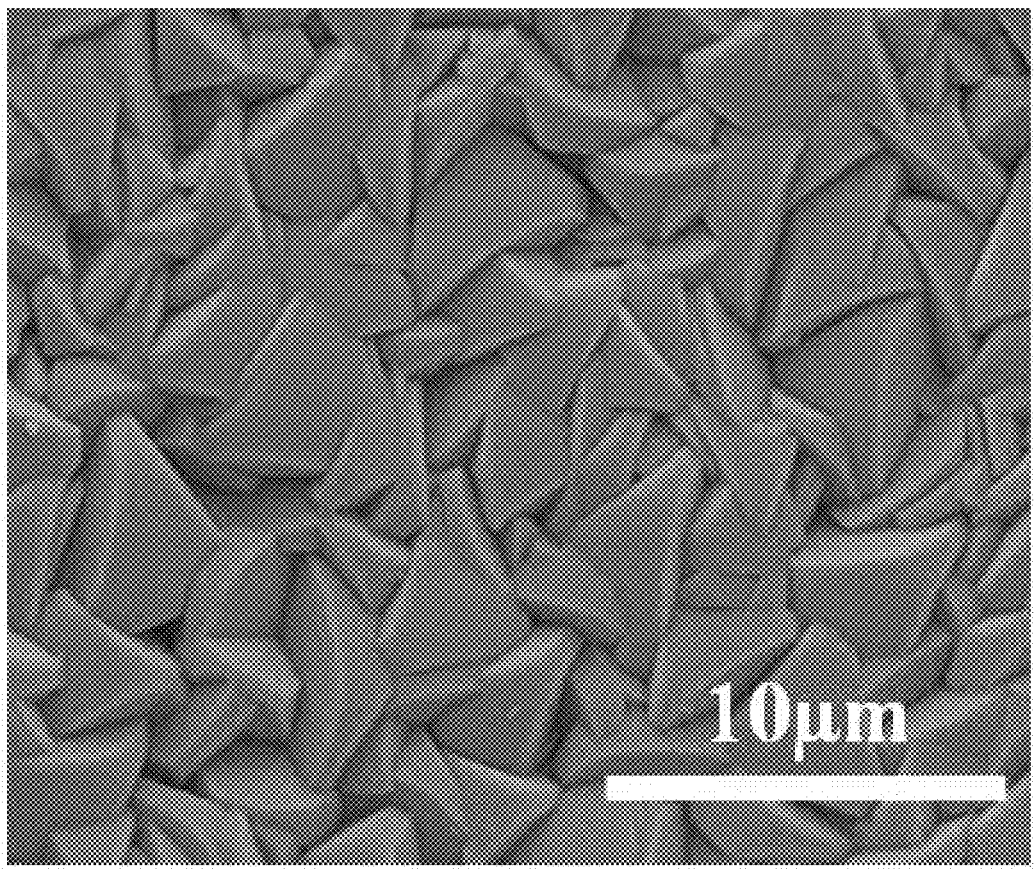
FIG. 3 is the surface of a DDR zeolite membrane activated by ozone at 200° C.

FIG. 3 shows the microstructure of the membrane surface after it is activated in ozone at low temperature. It can be seen from the figure that the membrane layer is continuous and compact without cracks and defects.

Example 2

(1) The Sigma-1 zeolite particles already prepared were crushed by a high-energy ball mill into 500 nm fine powder as a seed crystal, the Sigma-1 seed crystal was added into water to prepare into a 0.5% seed crystal suspension, and the pretreated sheet alumina support was immersed into the seed crystal suspension for 10 s and dried at 100° C. for 10 h to obtain the support loaded with the seed crystal;

(2) Synthesizing DDR zeolite membrane: ADA, silica source, EN and water were mixed, stirred and aged at 95° C. for 1 h ($ADA/SiO_2=0.09$, $EN/ADA=16$, $H_2O/ADA=40$); and a support loaded with seed crystal was placed into a synthesis solution and synthesized at 150° C. for 48 h;

(3) Activating DDR zeolite membrane: the template was removed from the membrane pores in an ozone atmosphere at 200° C. for 40 h, wherein the heating rate was 1° C./min and the cooling rate was 1° C./min.

Example 3

(1) The Sigma-1 zeolite particles already prepared were crushed by a high-energy ball mill into 500 nm fine powder as a seed crystal, the Sigma-1 seed crystal was added into water to prepare into a 0.5% seed crystal suspension, and the pretreated hollow fiber alumina support was immersed into the seed crystal suspension for 10 s and dried at 100° C. for 10 h to obtain the support loaded with the seed crystal;

(2) Synthesizing DDR zeolite membrane: ADA, silica source, EN and water were mixed, stirred and aged at 30° C. for 2 h (ADA/SiO$_2$=0.03, EN/ADA=20, H$_2$O/ADA=40); and a support loaded with seed crystal was placed into a synthesis solution and synthesized at 140° C. for 48 h;

(3) Activating DDR zeolite membrane: the template was removed from the membrane pores in an ozone atmosphere at 200° C. for 80 h, wherein the heating rate was 1° C./min and the cooling rate was 1° C./min.

Example 4

(1) About 2 μm of Sigma-1 zeolite particles originally prepared was used as a seed crystal, the Sigma-1 seed crystal was added into water to prepare into a 0.5% seed crystal suspension, and the pretreated hollow fiber alumina support was immersed into the seed crystal suspension for 20 s and dried at 100° C. for 10 h to obtain the support loaded with the seed crystal;

(2) Synthesizing DDR zeolite membrane: ADA, silica source, EN and water were mixed, stirred and aged at normal temperature for 1 h (ADA/SiO$_2$=0.03, EN/ADA=16, H$_2$O/ADA=40); and a support loaded with seed crystal was placed into a synthesis solution and synthesized at 140° C. for 56 h;

(3) Activating DDR zeolite membrane: the template was removed from the membrane pores in an ozone atmosphere at 250° C. for 60 h, wherein the heating rate was 1° C./min and the cooling rate was 1° C./min.

Example 5

(1) About 2 μm of Sigma-1 zeolite particles originally prepared was used as a seed crystal, the Sigma-1 seed crystal was added into water to prepare into a 1% seed crystal suspension, and the pretreated hollow fiber alumina support was immersed into the seed crystal suspension for 10 s and dried at 100° C. for 10 h to obtain the support loaded with the seed crystal;

(2) Synthesizing DDR zeolite membrane: ADA, silica source, EN and water were mixed, stirred and aged at 95° C. for 1 h (ADA/SiO$_2$=0.06, EN/ADA=16, H$_2$O/ADA=40); and a support loaded with seed crystal was placed into a synthesis solution and synthesized at 150° C. for 36 h;

(3) Activating DDR zeolite membrane: the template was removed from the membrane pores in an ozone atmosphere at 180° C. for 100 h, wherein the heating rate was 1° C./min and the cooling rate was 1° C./min.

Example 6

(1) The Sigma-1 zeolite particles already prepared were crushed by a high-energy ball mill into 500 nm fine powder as a seed crystal, the Sigma-1 seed crystal was added into water to prepare into a 1% seed crystal suspension, and the pretreated sheet alumina support was immersed into the seed crystal suspension for 10 s and dried at 100° C. for 10 h to obtain the support loaded with the seed crystal;

(2) Synthesizing DDR zeolite membrane: ADA, silica source, EN and water were mixed, stirred and aged at 95° C. for 1 h (ADA/SiO$_2$=0.09, EN/ADA=16, H$_2$O/ADA=40); and a support loaded with seed crystal was placed into a synthesis solution and synthesized at 160° C. for 18 h;

(3) Activating DDR zeolite membrane: the template was removed from the membrane pores in an ozone atmosphere at 200° C. for 60 h, wherein the heating rate was 1° C./min and the cooling rate was 1° C./min.

Example 7

(1) The Sigma-1 zeolite particles already prepared were crushed by a high-energy ball mill into 200 nm fine powder as a seed crystal, the Sigma-1 seed crystal was added into water to prepare into a 2% seed crystal suspension, and the pretreated sheet alumina support was immersed into the seed crystal suspension for 15 s and dried at 110° C. for 6 h to obtain the support loaded with the seed crystal;

(2) Synthesizing DDR zeolite membrane: ADA, silica source, EN and water were mixed, stirred and aged at 95° C. for 2 h (ADA/SiO$_2$=0.15, EN/ADA=26, H$_2$O/ADA=35); and a support loaded with seed crystal was placed into a synthesis solution and synthesized at 130° C. for 24 h;

(3) Activating DDR zeolite membrane: a solution containing 10 mol/L of nitric acid and 10 mol/L of hydrogen peroxide at the ratio of 1:1 was treated in a microwave digester; wherein the treatment temperature was 150° C., the removal time was 15 h, the heating rate was 1° C./min, and the cooling rate was 1° C./min.

Example 8

(1) The Sigma-1 zeolite particles already prepared were crushed by a high-energy ball mill into 500 nm fine powder as a seed crystal, the Sigma-1 seed crystal was added into water to prepare into a 1% seed crystal suspension, and the pretreated sheet alumina support was immersed into the seed crystal suspension for 10 s and dried at 100° C. for 10 h to obtain the support loaded with the seed crystal;

(2) Synthesizing DDR zeolite membrane: ADA, silica source, EN and water were mixed, stirred and aged at 95° C. for 1 h (ADA/SiO$_2$=0.09, EN/ADA=16, H$_2$O/ADA=40); and a support loaded with seed crystal was placed into a synthesis solution and synthesized at 160° C. for 36 h;

(3) Activating DDR zeolite membrane: under ultraviolet irradiation with the intensity of 150 mW/cm$^2$, the template was removed at 130° C., wherein the heating rate was 1° C./min and the cooling rate was 1° C./min.

Example 9

(1) The Sigma-1 zeolite particles already prepared were crushed by a high-energy ball mill into 100 nm fine powder as a seed crystal, the Sigma-1 seed crystal into water was added to prepare into a 1.5% seed crystal suspension, and the pretreated sheet alumina support was immersed into the seed crystal suspension for 25 s and dried at 120° C. for 3 h to obtain the support loaded with the seed crystal;

(2) Synthesizing DDR zeolite membrane: ADA, silica source, EN and water were mixed, stirred and aged at 80° C. for 3 h (ADA/SiO$_2$=0.2, EN/ADA=20, H$_2$O/ADA=45); and a support loaded with seed crystal was placed into a synthesis solution and synthesized at 135° C. for 36 h;

(3) Activating DDR zeolite membrane: based on Fenton treatment, $Fe^{2+}$ concentration of the reaction solution was 10 mmol/L, H$_2$O$_2$ 5 wt %, and the template was removed at 85° C. for 20 h, wherein the heating rate was 1° C./min, and the cooling rate was 1° C./min.

Example 10

(1) The Sigma-1 zeolite particles already prepared were crushed by a high-energy ball mill into 100 nm fine powder as a seed crystal, the Sigma-1 seed crystal was added into water to prepare into a 1.5% seed crystal suspension, and the pretreated sheet alumina support was immersed into the seed crystal suspension for 25 s and dried at 120° C. for 3 h to obtain the support loaded with the seed crystal;

(2) Synthesizing DDR zeolite membrane: ADA, silica source, EN and water were mixed, stirred and aged at 80° C. for 3 h (ADA/SiO$_2$=0.2, EN/ADA=20, H$_2$O/ADA=45); and a support loaded with seed crystal was placed into a synthesis solution and synthesized at 135° C. for 36 h;

(3) Activating DDR zeolite membrane: based on Fenton treatment, Fe$^{2+}$ concentration of the reaction solution was 10 mmol/L, H$_2$O$_2$ was 5 wt %, alkylphenol polyoxyethylene ether was TX-10 0.05 wt %, and the template was removed at 85° C. for 20 h, wherein the heating rate was 1° C./min and the cooling rate was 1° C./min.

Comparative Example 1

The other conditions were the same as in Example 1, except step (3), where the template was removed from the membrane at 200° C., with the heating rate of 0.5° C./min and the cooling rate of 1° C./min.

Figure 4:
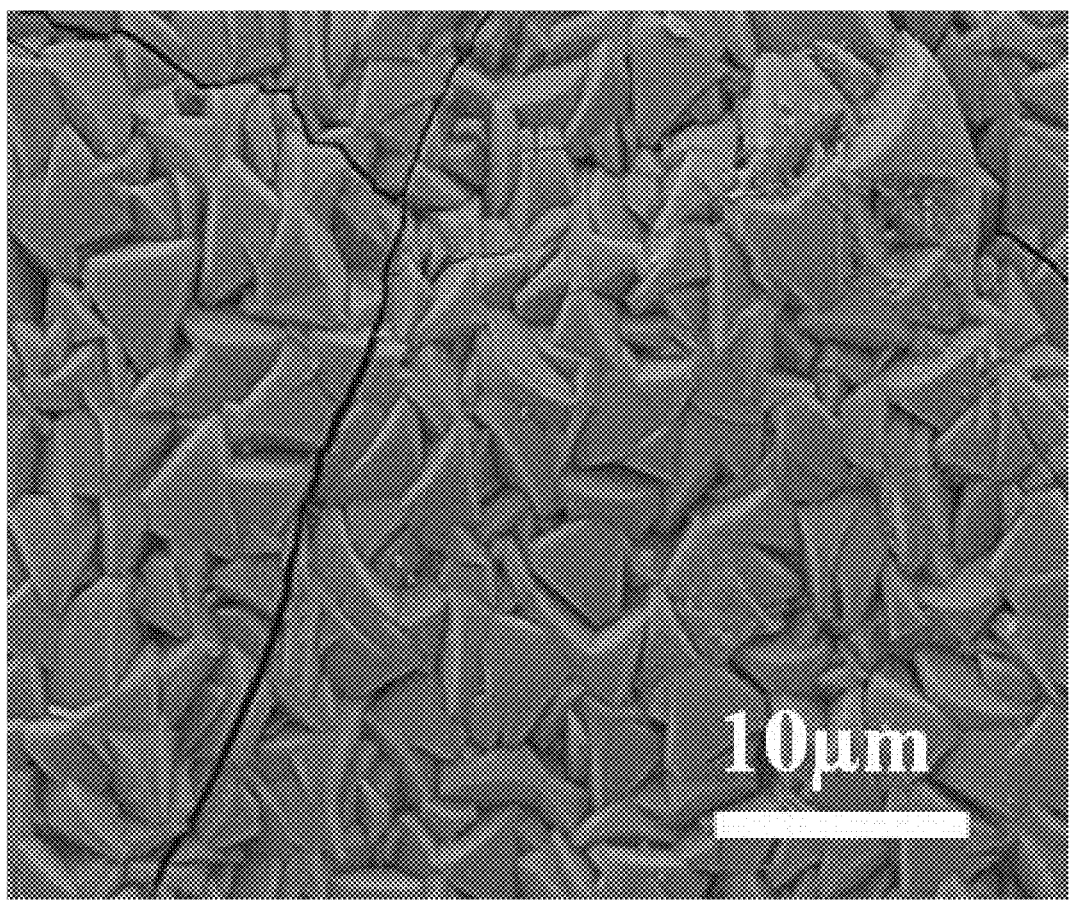
FIG. 4 is the surface of a DDR zeolite membrane activated by air at 600° C.

FIG. 4 shows the microstructure of the membrane surface in this comparative example after it is activated in oxygen at high temperature. It can be seen from the figure that cracks are formed in the membrane layer.

Comparative Example 2

The other conditions were the same as in Example 1, except step (3), where the template was removed from the membrane at 200° C., with the heating rate of 0.5° C./min and the cooling rate of 1° C./min.

Comparative Example 3

The other conditions were the same as in Example 1, except step (3), where the template was removed from the membrane at 500° C., with the heating rate of 0.5° C./min and the cooling rate of 1° C./min.

Comparative Example 4

The other conditions were the same as in Example 2, except step (3), where the template was removed from the membrane at 600° C., with the heating rate of 0.1° C./min and the cooling rate of 0.5° C./min.

Gas Separation Performance Test of DDR Zeolite Membrane

The gas permeance P and separation selectivity α are two factors for evaluating gas separation performance, where gas permeance P represents the amount of gas passing through a unit membrane area per unit time and per unit pressure, P=N/(A×t×ΔP); and separation selectivity is used to evaluate the membrane separation efficiency, α=P$_{CO2}$/P$_{CH4}$.

The membranes prepared in the above examples were tested for gas separation at 25° C., 0.1 MPa by using equimolar CO$_2$/CH$_4$ as the feed, a soap bubble flowmeter to test the permeate side flow rate, and the Shimadzu gas chromatography (GC-2014) to measure the gas composition at the permeate side.

The DDR zeolite membranes synthesized in the examples and comparative examples were used for the gas separation performance test at 25° C., 0.1 Mpa and CO$_2$/CH$_4$ (50/50). The gas separation results are shown in Table 1.

TABLE 1

| | Synthesis time/h | Activation method | Activation temperature/° C. | Activation time/h | CO$_2$ permeance mol·m$^{-2}$·s$^{-1}$·Pa$^{-1}$ | Separation selectivity of CO$_2$/CH$_4$ |
|---|---|---|---|---|---|---|
| Example 1 | 48 | Ozone | 200° C. | 60 | 1 × 10$^{-7}$ | 200 |
| Example 2 | 48 | Ozone | 200° C. | 40 | 1 × 10$^{-8}$ | 100 |
| Example 3 | 48 | Ozone | 200° C. | 80 | 2 × 10$^{-7}$ | 200 |
| Example 4 | 56 | Ozone | 250° C. | 60 | 5 × 10$^{-8}$ | 500 |
| Example 5 | 36 | Ozone | 180° C. | 100 | 2 × 10$^{-7}$ | 50 |
| Example 6 | 18 | Ozone | 200° C. | 60 | 1 × 10$^{-6}$ | 20 |
| Example 7 | 24 | Microwave digestion | 150° C. | 15 | 5 × 10$^{-7}$ | 50 |
| Example 8 | 36 | Ultraviolet | 130° C. | 100 | 2 × 10$^{-7}$ | 80 |
| Example 9 | 36 | Fenton | 85 | 20 | 5 × 10$^{-8}$ | 80 |
| Example 10 | 36 | Fenton | 85 | 20 | 3 × 10$^{-7}$ | 200 |
| Comparative example 1 | 48 | Oxygen | 200° C. | 60 | Airtight | 1 |
| Comparative example 2 | 48 | Air | 200° C. | 60 | Airtight | 1 |
| Comparative example 3 | 48 | Air | 500° C. | 10 | Cracking | 1 |
| Comparative example 4 | 48 | Air | 600° C. | 10 | Cracking | 1 |

It can be seen from Table 1 that Examples 1, 2 and 3 show different ozone roasting time to examine the performance of the membrane; specifically, the ozone roasting time is 40 h in Example 2, and this value is 60 h and 80 h respectively in Examples 1 and 3. In Example 2, the CO$_2$ permeance and CO$_2$/CH$_4$ separation factor are relatively low, for the reason that the roasting process is so short at low temperature that the template in the membrane pores is not completely oxidized, resulting in partial membrane pores being blocked, as well as relatively low permeance and separation selectivity. It can be seen that the roasting time of ozone at low temperature should be more than 60 h. Examples 3, 4, 5 and 6 show different synthesis time to investigate the film forming performance. The synthesis time is preferably about 48 h in Example 3, considering the following facts that the film synthesized for 18 h in Example 6 has not yet formed a dense film layer, the film synthesized for 36 h in Example 5 has poor separation performance, and the film synthesized for 56 h in Example 4 has low permeance. The template is removed by the microwave digestion and UV treatment in Examples 7 and 8 respectively. However, Fenton reaction technology is used to remove the template in Example 10, wherein a trace amount of surfactant is added to break the interface between the template and the reaction solution, which allows the template to be removed better at low temperature and improves the flux and separation effect. Comparing Example 1 with comparative example 1, it can be seen that the DDR zeolite membrane activated by ozone at low temperature in Example 1 has no cracking phenomenon and reveals better separation performance. In comparative example, the zeolite membrane is activated in oxygen or air at low temperature, and the template in the membrane pores cannot be removed, so the membrane layer is impermeable to air; at the same time, the DDR zeolite membrane is activated by air at high temperature, in that case, the membrane layer has large cracks and has no separation performance for $CO_2/CH_4$ although the membrane pores are opened after activation.

What is claimed is:

1. A method for preparing a defect-free DDR zeolite membrane, comprising the following steps:
    Step 1 preparing a support loaded with seed crystals: adding Sigma-1 seed crystals into water to prepare a seed crystal suspension, and applying the seed crystal suspension on the surface of the porous support to obtain seed crystals;
    Step 2 synthesizing a DDR zeolite membrane: mixing and aging amantadine (ADA), silica source, ethylenediamine (EN) and water as a synthesis liquid; and adding the support loaded with seed crystal into the synthesis liquid for hydrothermal synthesis to generate a DDR zeolite membrane;
    Step 3 activating DDR zeolite membrane: treating the synthesized DDR zeolite membrane in an ozone atmosphere or by an external field assisted technology to remove the template ADA, thus obtaining the defect-free DDR zeolite membrane,
    wherein the aging parameters in the step 2 are as follows: aging at 20-120° C. for 1-10 h; the molar ratio of ADA, silica source, EN and water is: $ADA/SiO_2$=0.01-0.2, EN/ADA=8-32, $H_2O$/ADA=20-50; and the parameters of hydrothermal synthesis step are: synthesizing at 130-170° C. for 12 h-4 d.

2. The method for preparing a defect-free DDR zeolite membrane according to claim 1, wherein the mass concentration of the Sigma-1 seed crystal in water is 0.2-2%; and the time for applying the seed crystal suspension is 5-50 s in the step 1.

3. The method for preparing a defect-free DDR zeolite membrane according to claim 1, wherein the Sigma-1 zeolite used in the step 1 can be directly obtained by hydrothermal synthesis or treated by a high-energy ball milling method.

4. The method for preparing a defect-free DDR zeolite membrane according to claim 1, wherein the porous support used in the step 1 is a flat plate, tubular or hollow fiber support.

5. The method for preparing a defect-free DDR zeolite membrane according to claim 1, wherein the method for applying the seed crystal suspension may be selected from one or more of the following methods: spin coating, wiping coating, dip coating or vacuum pumping in the step 1.

6. The method for preparing a defect-free DDR zeolite membrane according to claim 1, wherein the as-synthesized DDR zeolite membrane is treated in an ozone atmosphere or by an external field assisted technology for 10-100 h at 20-300° C., with the heating rate being 0.5-2° C./min in the step 3.

7. The method for preparing a defect-free DDR zeolite membrane according to claim 1, wherein the external field assisted technology is selected from one or more of the following methods: ultraviolet irradiation, microwave digestion or Fenton reaction in the step 3.

8. The method for preparing a defect-free DDR zeolite membrane according to claim 7, wherein the ultraviolet irradiation intensity is 50-600 mW/cm$^2$; the digestion solution used in the microwave digestion is a mixed solution of nitric acid and hydrogen peroxide, the power of the microwave digestion instrument is 500-2000 W, and the digestion temperature is 90-250° C.; the Fenton reagent in the Fenton reaction is a mixed solution of ferrous sulfate solution and hydrogen peroxide; wherein $FeSO_4.7H_2O$ is added into the reaction solution, and the $Fe^{2+}$ concentration is controlled to be 4.0-15.0 mmol/L and the $H_2O_2$ mass concentration is controlled to be 1.0-10.0%.

\* \* \* \* \*